US012605916B2

(12) United States Patent
Lin et al.

(10) Patent No.: US 12,605,916 B2
(45) Date of Patent: Apr. 21, 2026

(54) FLEXIBLE SUPPORT PLATE AND DISPLAY APPARATUS

(71) Applicants: CHENGDU BOE OPTOELECTRONICS TECHNOLOGY CO., LTD., Chengdu (CN); BOE Technology Group Co., LTD., Beijing (CN)

(72) Inventors: Xinqi Lin, Beijing (CN); Yanli Wang, Beijing (CN); Yangyang Cai, Beijing (CN); Jiaxiang Wang, Beijing (CN); Wei Gong, Beijing (CN); Hong Zhu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 735 days.

(21) Appl. No.: 17/802,993

(22) PCT Filed: Nov. 1, 2021

(86) PCT No.: PCT/CN2021/127893
§ 371 (c)(1),
(2) Date: Aug. 29, 2022

(87) PCT Pub. No.: WO2022/156305
PCT Pub. Date: Jul. 28, 2022

(65) Prior Publication Data
US 2023/0103864 A1 Apr. 6, 2023

(30) Foreign Application Priority Data
Jan. 21, 2021 (CN) .......................... 202110084246.1

(51) Int. Cl.
*G06F 1/16* (2006.01)
*B32B 3/08* (2006.01)
(Continued)

(52) U.S. Cl.
CPC .................. *B32B 3/08* (2013.01); *B32B 7/12* (2013.01); *G06F 1/1652* (2013.01); *B32B 15/01* (2013.01);
(Continued)

(58) Field of Classification Search
CPC ......... G06F 1/1652; B32B 3/266; B32B 7/12; B32B 2457/20; B32B 3/08
See application file for complete search history.

(56) References Cited

U.S. PATENT DOCUMENTS

2015/0179728 A1 6/2015 Kwon et al.
2016/0093644 A1 3/2016 Ki et al.
(Continued)

FOREIGN PATENT DOCUMENTS

CN 104733498 A 6/2015
CN 106716642 A 5/2017
(Continued)

*Primary Examiner* — Joanna Pleszczynska
(74) *Attorney, Agent, or Firm* — Lippes Mathias LLP

(57) ABSTRACT

Provided is a flexible support plate including a first support plate. The first support plate is provided with a first flat region and a roll-slide region that are connected to each other. The first support plate includes a wholly-plate-shaped structure disposed in the first flat region and a plate-shaped structure disposed in the roll-slide region and provided with a plurality of hollowed-out regions; wherein in the roll-slide region, proportions of total areas of the hollowed-out regions in unit areas monotonically decrease along a first direction, such that capabilities of the flexible support plate to absorb stress and strain, in the roll-slide region, monotonically decrease along the first direction, the first direction being a direction from the first flat region to the roll-slide region.

17 Claims, 10 Drawing Sheets

(51) Int. Cl.
  *B32B 3/26*      (2006.01)
  *B32B 7/12*      (2006.01)
  *B32B 15/01*      (2006.01)
  *B32B 15/18*      (2006.01)

(52) U.S. Cl.
  CPC ........... *B32B 15/011* (2013.01); *B32B 15/013*
    (2013.01); *B32B 15/18* (2013.01); *B32B*
    *2250/40* (2013.01); *B32B 2255/06* (2013.01);
      *B32B 2307/51* (2013.01); *B32B 2307/732*
        (2013.01); *B32B 2457/20* (2013.01)

(56)              References Cited

U.S. PATENT DOCUMENTS

2020/0051881  A1*   2/2020  Park ........................ B32B 27/06
2021/0165447  A1    6/2021  Wang et al.

2021/0165454  A1   6/2021  Dong et al.
2021/0168929  A1   6/2021  Wang et al.
2022/0036771  A1   2/2022  Peng et al.

FOREIGN PATENT DOCUMENTS

| | | |
|---|---|---|
| CN | 206610569 U | 11/2017 |
| CN | 109448554 A | 3/2019 |
| CN | 110718558 A | 1/2020 |
| CN | 110767098 A | 2/2020 |
| CN | 110853520 A | 2/2020 |
| CN | 110992828 A | 4/2020 |
| CN | 111524902 A | 8/2020 |
| CN | 211604573 U | 9/2020 |
| CN | 111933031 A | 11/2020 |
| CN | 112150930 A | 12/2020 |
| CN | 214541377 U | 10/2021 |
| KR | 20160144912 A | 12/2016 |
| KR | 20200087470 A | 7/2020 |

* cited by examiner

400

300 c

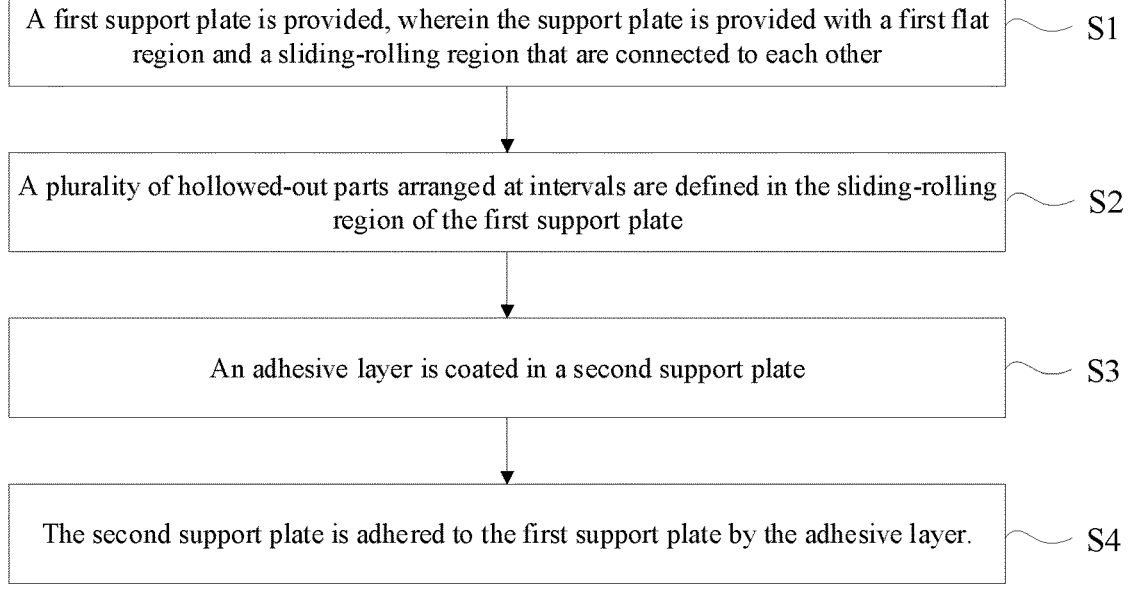

| A first support plate is provided, wherein the support plate is provided with a first flat region and a sliding-rolling region that are connected to each other | S1 |

| A plurality of hollowed-out parts arranged at intervals are defined in the sliding-rolling region of the first support plate | S2 |

| An adhesive layer is coated in a second support plate | S3 |

| The second support plate is adhered to the first support plate by the adhesive layer. | S4 |

FIG. 14

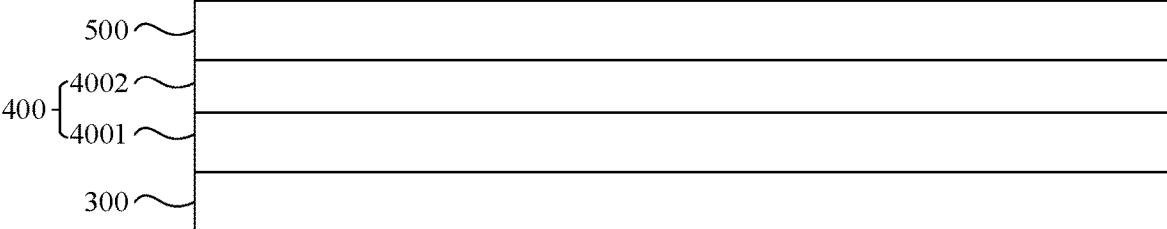

FIG. 15

FLEXIBLE SUPPORT PLATE AND DISPLAY APPARATUS

CROSS-REFERENCE TO RELATED APPLICATION

This application is a 371 of PCT application No. PCT/CN2021/127893, filed on Nov. 1, 2021, which claims priority to Chinese Patent Application No. 202110084246.1, filed on Jan. 21, 2021 and entitled "FLEXIBLE SUPPORT PLATE AND DISPLAY APPARATUS," the contents of which are herein incorporated by reference in their entireties.

TECHNICAL FIELD

The present disclosure relates to the field of display technologies, and in particular, relates to a flexible support plate and a display apparatus.

BACKGROUND

A roll-slide screen is a novel display screen. Users steplessly adjust a screen size of the roll-slide screen according to actual needs.

SUMMARY

Embodiments of the present disclosure provide a flexible support plate and a display apparatus.

According to some embodiments of the present disclosure, a flexible support plate is provided. The flexible support plate includes a first support plate, wherein the first support plate is provided with a first flat region and a roll-slide region that are connected to each other; and the first support plate includes a wholly-plate-shaped structure disposed in the first flat region and a plate-shaped structure disposed in the roll-slide region and provided with a plurality of hollowed-out regions: wherein in the roll-slide region, proportions of total areas of the hollowed-out regions in unit areas monotonically decrease along a first direction, such that capabilities of the flexible support plate to absorb stress and strain, in the roll-slide region, monotonically decrease along the first direction, the first direction being a direction from the first flat region to the roll-slide region.

In some embodiments of the present disclosure, the first support plate further includes a first boundary support bar, a second boundary support bar, and a plurality of support bars that are disposed in the roll-slide region, wherein one end of the first boundary support bar and one end of the second boundary support bar are connected to a first side edge of the wholly-plate-shaped structure, the first boundary support bar and the second boundary support bar both extend along the first direction, the other end of the first boundary support bar is connected to the other end of the second boundary support bar by a second side edge of a connection plate, and the plurality of support bars are connected between the first boundary support bar and the second boundary support bar to define the plurality of hollowed-out regions.

In some embodiments of the present disclosure, the plurality of support bars includes a plurality of first support bars and a plurality of second support bars; wherein the plurality of first support bars are parallel to each other, two ends of each of the first support bars are respectively connected to the first boundary support bar and the second boundary support bar, and distances between two adjacent first support bars monotonically decrease along the first direction: wherein a portion of the plurality of second support bars are connected between any two adjacent first support bars to define the plurality of hollowed-out regions.

In some embodiments of the present disclosure, the portion of the plurality of second support bars connected between any two adjacent first support bars comprise a plurality of first unit structures arranged along a second direction, any of the plurality of first unit structures including a first section, a second section, a third section, a fourth section, and a fifth section, wherein the first section is disposed between two adjacent first support bars and extends along the second direction, one end of the first section is connected to the two adjacent first support bars by the second section and the third section, and the other end of the first section is connected to the two adjacent first support bars by the fourth section and the fifth section; and in the second direction and in any two adjacent first unit structures, the fourth section of one of the any two adjacent first unit structures and the second section of the other of the any two adjacent first unit structures are connected to a same point of a same first support bar, and the fifth section of one of the any two adjacent first unit structures and the third section of the other of the any two adjacent first unit structures are connected to a same point of a same first support bar; wherein the second direction is an extension direction of a roll-slide shaft when the roll-slide region rolls and slides and is perpendicular to the first direction, and each of the first section to the fifth section is respectively one of the plurality of second support bars.

In some embodiments of the present disclosure, in any of the plurality of first unit structures, the first section, the second section, the fourth section, and a first support bar connected between the third section and the fourth section form one of the hollowed-out regions in a shape of isosceles trapezoid; and in the any of the plurality of first unit structures, the first section, the third section, the fifth section, and a first support bar connected between the third section and the fifth section form another of the hollowed-out regions in the shape of isosceles trapezoid:

wherein two adjacent isosceles trapezoidal hollowed-out regions of two first unit structures adjacent in the second direction have a common bottom edge, the two isosceles trapezoids with the common bottom edge being symmetrically distributed with the first support bar to which the bottom edge belongs as an axis.

In some embodiments of the present disclosure, an included angle between the first section and the second section ranges from 120 degrees to 175 degrees.

In some embodiments of the present disclosure, the portion of the plurality of second support bars connected between any two adjacent first support bars comprise a plurality of second unit structures arranged along a second direction, any of the plurality of second unit structures including a sixth section, a seventh section, an eighth section, and a ninth section, wherein one end of the sixth section, one end of the seventh section, one end of the eighth section, and one end of the ninth section are connected at a same point, the other end of the sixth section and the other end of the seventh section are connected to one of two adjacent first support bars, and the other end of the eighth section and the other end of the ninth section are connected to the other of the two adjacent first support bars; and in the second direction and in any two adjacent second unit structures, the other end of the seventh section of one of the any two adjacent second unit structures and the other end of the sixth section of the other of the any two adjacent second unit structures are connected to a same point of a same first support bar, and the other end of the ninth section of one of the any two adjacent second unit structures and the other end of the eighth section of the other of the any two adjacent second unit structures are connected to a same point of a same first support bar: wherein the second direction is an extension direction of a roll-slide shaft when the roll-slide region rolls and slides and is perpendicular to the first direction, and each of the sixth section to the ninth section is respectively one of the plurality of second support bars.

In some embodiments of the present disclosure, in any of the plurality of second structures, the sixth section, the seventh section, and a first support bar connected between the sixth section and the seventh section form one of the hollowed-out regions in a shape of isosceles triangle, and in the any of the plurality of first unit structures, the eighth section, the ninth section, and a first support bar connected between the eighth section and the ninth section form another of the hollowed-out regions in the shape of isosceles triangle: wherein two adjacent isosceles triangular hollowed-out regions of two second unit structures adjacent in the second direction have a common bottom edge, the two isosceles triangles with the common bottom edge being symmetrically distributed with the first support bar to which the bottom edge belongs as an axis.

In some embodiments of the present disclosure, an included angle between the sixth section and the seventh section ranges from 10 degrees to 170 degrees.

In some embodiments of the present disclosure, the plurality of support bars are parallel to each other, two ends of each of the support bars are respectively connected to the first boundary support bar and the second boundary support bar, and distances between two adjacent support bars monotonically decrease along the first direction: wherein a region between two adjacent support bars is one of the hollowed-out regions.

In some embodiments of the present disclosure, a width of the support bar ranges from 50 μm to 350 μm.

In some embodiments of the present disclosure, the proportions of the total areas of the hollowed-out regions in the unit areas are equal along the second direction, wherein the second direction is the extension direction of the roll-slide shaft when the roll-slide region rolls and slides and is perpendicular to the first direction.

In some embodiments of the present disclosure, the first support plate is a titanium plate or an alloy plate.

In some embodiments of the present disclosure, a thickness of the first support plate ranges from 100 μm to 500 μm.

In some embodiments of the present disclosure, the flexible support plate further includes: a second support plate, wherein the second support plate is of a wholly-plate-shaped structure; and an adhesive layer adhered between the first support plate and the second support plate.

In some embodiments of the present disclosure, a thickness of the second support plate ranges from 20 μm to 100 μm; and a thickness of the adhesive layer ranges from 10 μm to 300 μm.

In some embodiments of the present disclosure, a portion of the adhesive layer is disposed in the hollowed-out regions, and a ratio of a volume of the adhesive layer in any of the hollowed-out regions to a total volume of the hollowed-out region where the adhesive layer is disposed ranges from 10% to 20%.

According to some embodiments of the present disclosure, a display apparatus is provided. The display apparatus includes the flexible support plate as described above and a display module disposed on the flexible support plate.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 14 is a flowchart of manufacturing a flexible support plate according to some embodiments of the present disclosure; and FIG. 15 is a cross-sectional schematic diagram of a display apparatus according to some embodiments of the present disclosure.

DETAILED DESCRIPTION

The present disclosure will be described in further detail with reference to the enclosed drawings, to clearly present the objects, technical solutions, and advantages of the present disclosure.

In a device known to the inventor, the roll-slide screen includes a flexible support plate and a display module. The flexible support plate supports the display module to ensure an appearance of the roll-slide screen. The roll-slide screen is provided with a flat display region and a roll-slide display region, and the roll-slide screen is bent at different positions in the roll-slide display region. When the display screen of the roll-slide screen is required to be enlarged, the roll-slide display region is switched from a bent state to a flat state, such that a surface of the roll-slide display region and a surface of the flat display region are in a same plane, and thus the screen size of the roll-slide screen is enlarged to satisfy the watching requirement. When the display screen of the roll-slide screen is required to be reduced, the roll-slide screen is bent in the roll-slide display region, such that the roll-slide display region rolls and slides to a backside of the flat display region, and thus the screen size of the roll-slide screen is reduced and the roll-slide screen is more portable.

Figures 1, 2:
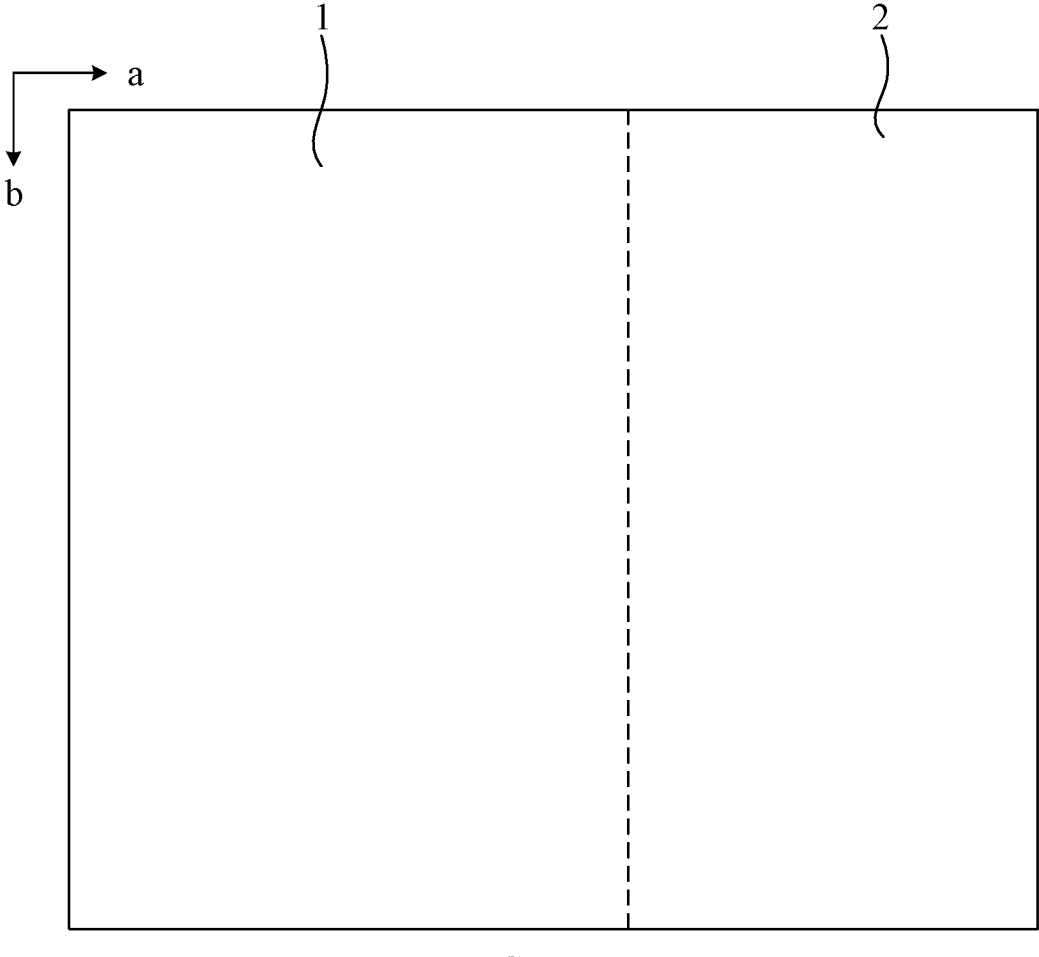
FIG. 1 is top view of a roll-slide screen in a completely unfolded state according to some embodiments of the present disclosure.
FIG. 2 is a cross-sectional view of a roll-slide screen in a completely unfolded state according to some embodiments of the present disclosure.

FIG. 1 is top view of a roll-slide screen in a completely unfolded state according to some embodiments of the present disclosure. Referring to FIG. 1, the roll-slide screen is provided with a flat display region 1 and a roll-slide display region 2 that are connected to each other. When the roll-slide screen unfolds, the flat display region 1 and the roll-slide display region 2 are within a same plane and display pictures together. In this case, a display region of the roll-slide screen is the greatest.

FIG. 2 is a cross-sectional view of a roll-slide screen in a completely unfolded state according to some embodiments of the present disclosure. Referring to FIG. 2, the roll-slide screen incudes a flexible support plate 300 and a display module 400 disposed upon the flexible support plate 300. The flexible support plate 300 is configured to support the display module 400 of the roll-slide screen.

When the roll-slide screen completely unfolds, and display surfaces of the display module 400 in the flat display region 1 and the roll-slide display region 2 are both within a display surface. During rolling and sliding of the roll-slide screen, bent states of the flexible support plate 300 and the display module 400 are synchronous. Accordingly, the flexible support plate 300 is provided with a flat region and a roll-slide region likewise. The flat region in the flexible support plate 300 is opposite to the flat display region 1 of the roll-slide screen, and the roll-slide region in the flexible support plate 300 is opposite to the roll-slide display region 2 of the roll-slide screen.

Figures 3, 4:
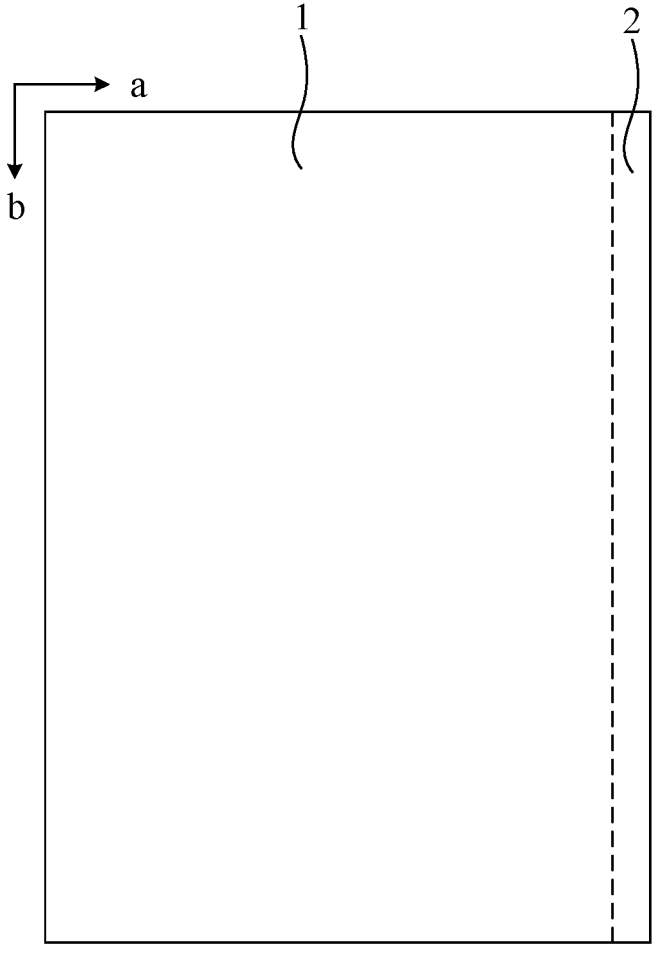
FIG. 3 is a top view of a roll-slide careen in a rolling and sliding state according to some embodiments of the present disclosure.
FIG. 4 is a cross-sectional view of a roll-slide careen in a rolling and sliding state according to some embodiments of the present disclosure.

FIG. 3 is a top view of a roll-slide careen in a rolling and sliding state according to some embodiments of the present disclosure. Referring to FIG. 3, during rolling and sliding of the roll-slide screen, the roll-slide display region 2 rolls and slides to a backside of the flat display region 1, in this case, the roll-slide display region 2 and the flat display region 1 are disposed on different planes. Therefore, only boundaries of the roll-slide display region 2 are viewable in FIG. 3. Compared with the roll-slide screen shown in FIG. 1, a width of a display screen of the roll-slide screen narrows, and a size of a surface of the roll-slide screen reduces. When the roll-slide screen rolls and slides until a roll-slide shaft is disposed at a junction of the roll-slide display region 2 and the flat display region 1, the size of the surface of the roll-slide screen is minimum.

In the embodiments of the present disclosure, the roll-slide shaft is a central axis about which a curved portion of the roll-slide display region 2 surrounds, when the roll-slide display region 2 rolls and slides.

In some embodiments, the central axis is a virtual axis, which does not actually exist in the roll-slide screen.

FIG. 4 is a cross-sectional view of a roll-slide careen in a rolling and sliding state according to some embodiments of the present disclosure. Referring to FIG. 4, when the roll-slide screen rolls and slides, due to different bending curvatures of different film layers and different lengths of the curve portion C, at one end, distal form the flat display region 1, of the roll-slide screen, boundaries of the different film layers in the roll-slide screen are unleveled and in a step shape.

Figure 5:
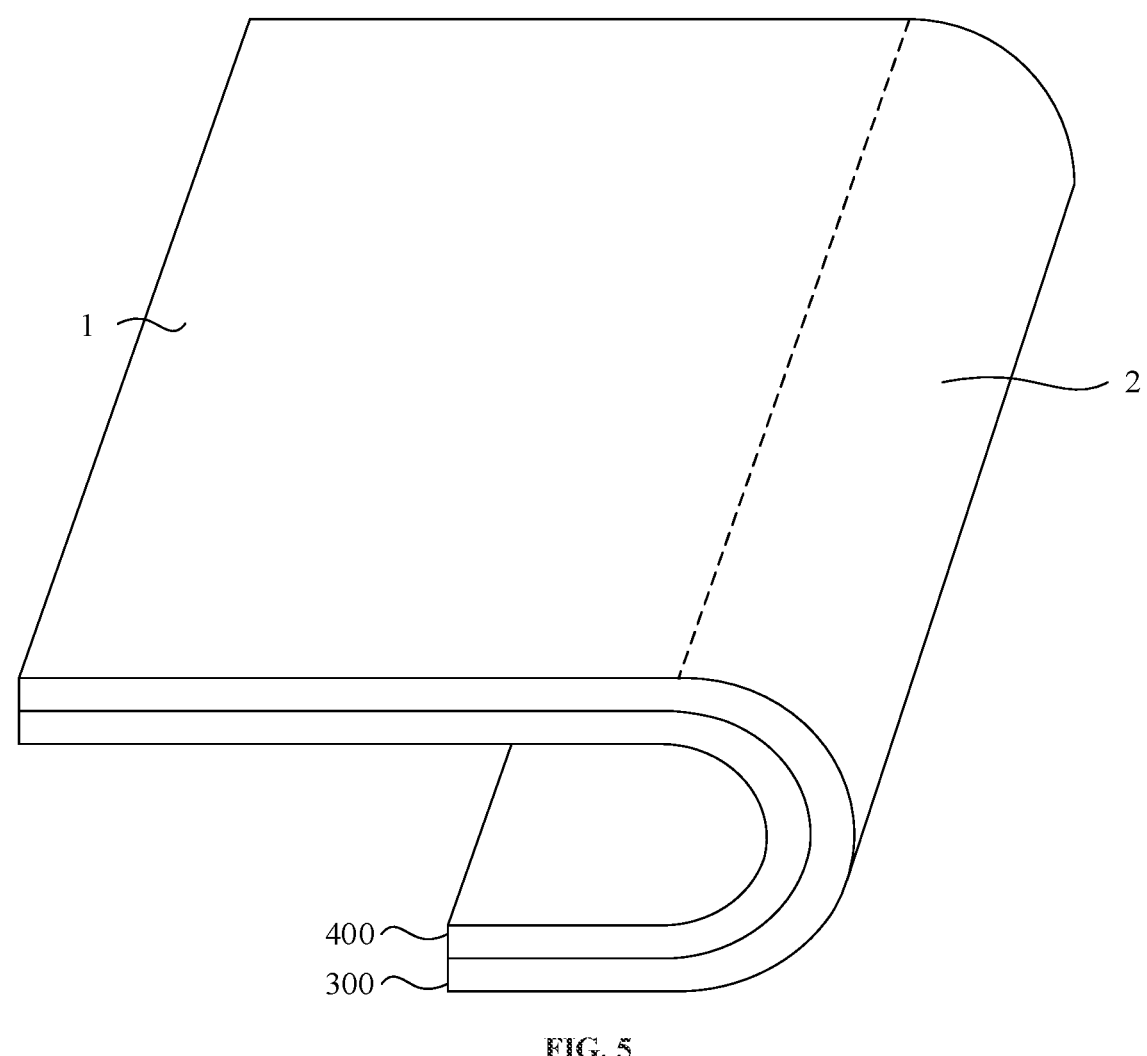
FIG. 5 is a schematic structural diagram of a roll-slide careen in a rolling and sliding state according to some embodiments of the present disclosure.

FIG. 5 is a schematic structural diagram of a roll-slide careen in a rolling and sliding state according to some embodiments of the present disclosure. Referring to FIG. 5, in the state of rolling and sliding, the roll-slide display region 2 slides to the backside of the flat display region 1.

Figures 6, 7:
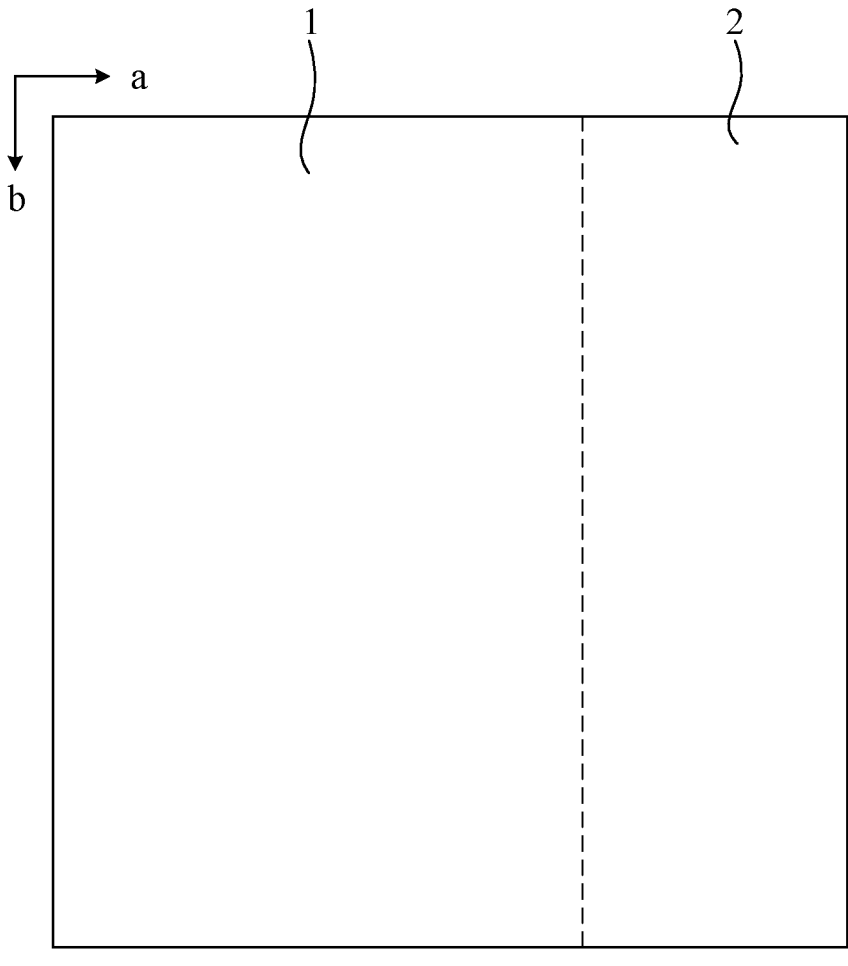
FIG. 6 is a top view of another roll-slide careen in a rolling and sliding state according to some embodiments of the present disclosure.
FIG. 7 is a cross-sectional view of another roll-slide careen in a rolling and sliding state according to some embodiments of the present disclosure.

FIG. 6 is a top view of another roll-slide careen in a rolling and sliding state according to some embodiments of the present disclosure. Referring to FIG. 6, a portion of the roll-slide display region 2 is still in the same plane with the flat display region 1, which is viewable in FIG. 6. Compared with the roll-slide screen shown in FIG. 3, the width of the display screen of the roll-slide screen shown in FIG. 6 widens, and the size of the surface of the roll-slide screen increases. Compared with the roll-slide screen shown in FIG. 1, the width of the display screen of the roll-slide screen shown in FIG. 6 narrows, and the size of the surface of the roll-slide screen reduces.

FIG. 7 is a cross-sectional view of another roll-slide careen in a rolling and sliding state according to some embodiments of the present disclosure. Referring to FIG. 7, the roll-slide display region 2 does not completely roll and slide to the backside of the flat display region 1. Referring to FIG. 4 and FIG. 7 together, during rolling and sliding of the roll-slide screen towards a side distal from the flat display region 1, the roll-slide shaft of the roll-slide screen also moves towards the side away from the flat display region 1. The larger the width of the display screen of the sling-rolling screen is, the farther the roll-slide shaft is from the flat display region 1.

Referring to FIG. 1 to FIG. 7 together, the display module 400 and the flexible support plate 300 in the flat display region 1 are always in a flat state, whereas the bent states of the display module 400 and the flexible support plate 300 in the roll-slide display region 2 are changed by rolling and sliding.

To reduce stress and strain of the roll-slide screen when rolling and sliding, the embodiments of the present disclosure provide a flexible support plate. Optionally, in the embodiments of the present disclosure, the flexible support plate is of a single-layer structure or a multilayer structure.

Figure 8:
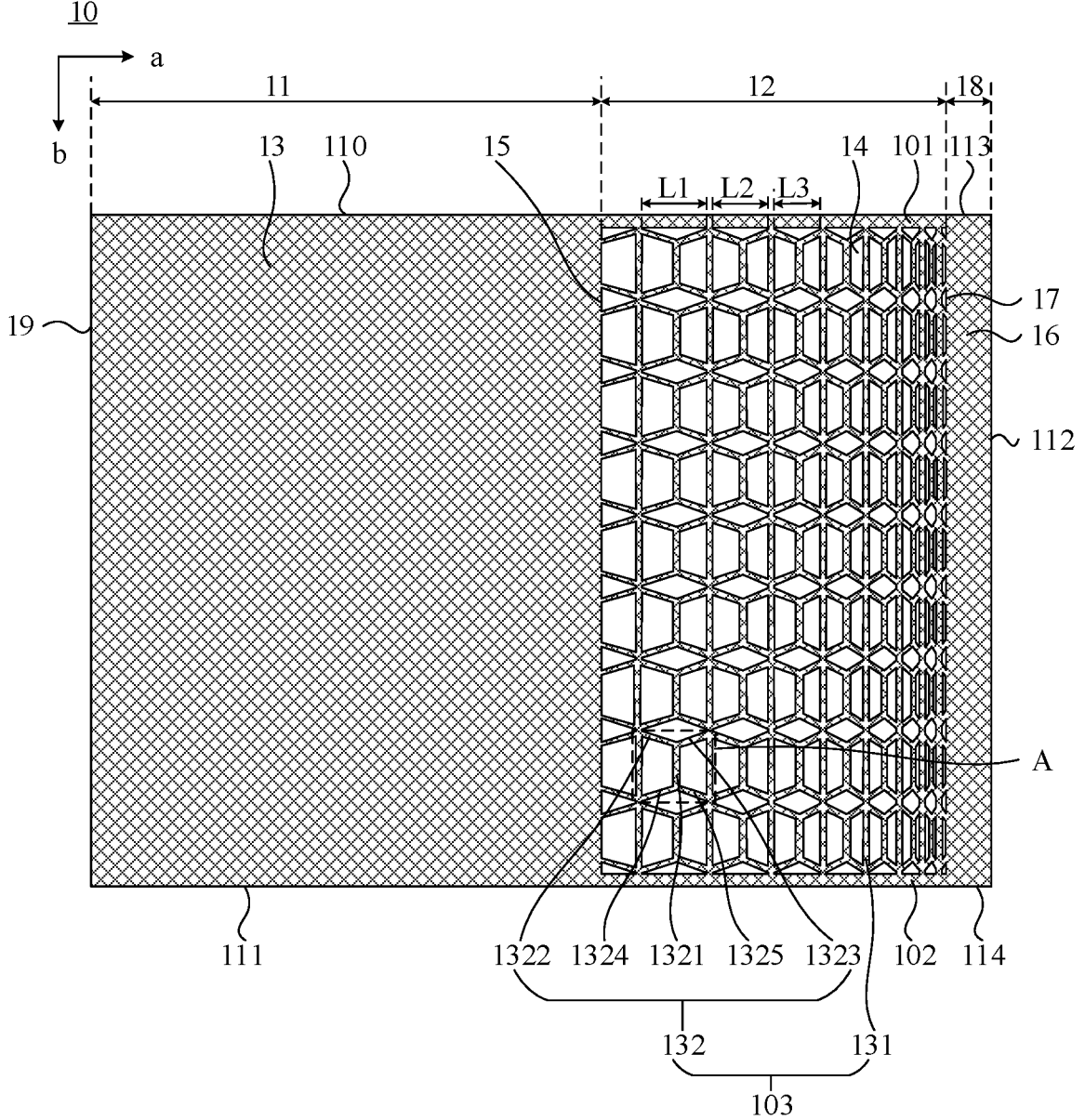
FIG. 8 is a top view of a flexible support plate according to some embodiments of the present disclosure.

FIG. 8 is a top view of a flexible support plate according to some embodiments of the present disclosure. In FIG. 8 the flexible support plate is of the single-layer structure. Referring to FIG. 8, the flexible support plate includes a first support plate 10. The first support plate 10 is provided with a first flat region 11 and a roll-slide region 12 that are connected to each other. The first support plate 10 includes a wholly-plate-shaped structure 13 disposed in the first flat region 11 and a plate-shaped structure disposed in the roll-slide region 12 and provided with a plurality of hollowed-out regions 14. In the roll-slide region 12, proportions of total areas of the hollowed-out regions 14 in unit areas monotonically decrease along a first direction a, such that capabilities of the flexible support plate to absorb the stress and strain, in the roll-slide region, monotonically decrease along the first direction a. The first direction a is a direction from the first flat region 11 to the roll-slide region 12, that is, the first direction a is a direction away from the first flat region 11 in an arrangement direction of the first flat region 11 and the roll-slide region 12.

In the embodiments of the present disclosure, proportions of total areas of the hollowed-out regions 14 in unit areas monotonically decrease along a first direction a means that: the roll-slide region 12 includes a plurality of first sub-regions side by side along the first direction a, areas of the plurality of first sub-regions are equal, and the unit area is the area of each of the plurality of first sub-regions; and along the first direction a, the proportion of the total area of hollowed-out regions 14 in a first first sub-region is the greatest, the proportion of the total area of hollowed-out regions 14 in a second first sub-region is less than the proportion of the total area of the hollowed-out regions 14 in the first first sub-region, the proportion of the total area of hollowed-out regions 14 in a third first sub-region is less than the proportion of the total area of the hollowed-out regions 14 in the second first sub-region, . . . , and so on.

During rolling and sliding or bending of the flexible support plate in the roll-slide region, stress at the roll-slide shaft is the greatest, and a part, proximal to the first flat region, of the flexible support plate in the roll-slide region rolls and slides more times, such that in the roll-slide region, the part of the first support plate closer to the first flat region is more prone to damages. By causing the areas of the hollowed-out regions in the unit areas to monotonically decrease, that is, porosities of the first support plate monotonically decrease along the first direction, the capabilities of the flexible support plate to absorb the stress and strain monotonically decrease along the first direction. In this way, in the roll-slide region, the part of the first support plate closer to the first flat region has stronger capabilities of absorbing the stress and strain. During rolling and sliding or bending of the flexible support plate, the part of the flexible support plate that is prone to damages has the stronger capabilities of absorbing the stress and strain, such that a probability that the flexible support plate is damaged is reduced.

The first flat region 11 is opposite to the flat display region 11 of the roll-slide screen, and the roll-slide region 12 is opposite to the roll-slide display region 2 of the roll-slide screen.

Experimental verification shows that, during rolling and sliding of the roll-slide screen, in the roll-slide display region, the stress and strain at the roll-slide shaft is the greatest, and during moving along the first direction a of the roll-slide shaft, the stress and strain at the roll-slide shaft progressively decrease. In addition, when the roll-slide shaft slides to any position, the stress and strain, away from the roll-slide shaft along the first direction a, of the roll-slide screen monotonically decrease.

During the use of the roll-slide screen, the part in the roll-slide region 12 closer to the first flat region 11 rolls and slides more times, and accumulates more stress and strain, such that the part of the first support plate 10 closer to the first flat region 11 is more prone to damages.

Therefore, in the case that the part of the first support plate 10 in the roll-slide region 12 closer to the first flat region 11 has the stronger capabilities of absorbing the stress and strain, the damage of the first support plate is greatly mitigated.

In some embodiments of the present disclosure, the proportions of the total areas of the hollowed-out regions 14 in the unit areas along a second direction b are equal. The second direction b is an extension direction of the roll-slide shaft when the roll-slide region 12 rolls and slides.

In the embodiments of the present disclosure, during rolling and sliding of the flexible support plate, the stress and strain of the first support plate 10 are constant in the second direction b. The proportions of the total areas of the hollowed-out regions 14 in the unit areas along a second direction b are equal, which facilitates manufacturing the first support plate 10.

In the embodiments of the present disclosure, the proportions of the total areas of the hollowed-out regions 14 in the unit areas along a second direction b are equal means that:

the roll-slide region 12 includes a plurality of second sub-regions along the second direction b, areas of the plurality of second sub-regions are equal, and the unit area is the area of each of the plurality of second sub-regions; and along the second direction b, the proportions of the total areas of the hollowed-out regions 14 in each of the second sub-regions are equal.

In the embodiments of the present disclosure, the first support plate 10 is supportive and bendable both in the first flat region 11 and the roll-slide region 12. The first flat region 11 is of the wholly-plate-shaped structure 13 without hollowed-out regions, and thus compared with the roll-slide region 12, the intensity and the supporting performance of the first flat region 11 are enhanced. The roll-slide region 12 is provided with the plurality of hollowed-out regions 14, and thus compared with the first flat region 11, the roll-slide region 12 has good capabilities of absorbing the stress and strain and good bendability.

Referring to FIG. 8 again, the first support plate 10 includes a first boundary support bar 101, a second boundary support bar 101, and a plurality of support bars 103 that are disposed in the roll-slide region 12. One end of the first boundary support bar 101 and one end of the second boundary support bar 102 are connected to a first side edge 15 of the wholly-plate-shaped structure 15, and the first boundary support bar 101 and the second boundary support bar 102 are both extend along the first direction a. The other end of the first boundary support bar 101 is connected to the other end of the second boundary support bar 102 by a second side edge 17 of a connection plate 16. The plurality of support bars 103 are connected between the first boundary support bar 101 and the second boundary support bar 102 to define the plurality of hollowed-out regions 14.

The first support plate 10 of the roll-slide region 12 is conducted an edge sealing treatment by the first boundary support bar 101 and the second boundary support bar 102, such that a probability of occurring a cracking phenomenon in the first support plate 10 in the roll-slide region 12 is reduced. Simultaneously, the first boundary support bar 101 and the second boundary support bar 101 support the plurality of support bars 101, such that the supporting performance of the support bar 103 is improved.

Referring to FIG. 8 again, the first support plate 10 is further provided with a second flat region 18, which is connected to the roll-slide region 12. The roll-slide region 12 is disposed between the first flat region 11 and the second flat region 18 along the first direction a. The connection plate 16 is a wholly-plate-shaped structure of the second flat region 18, that is, two sides of the roll-slide region 12 are both of the wholly-plate-shaped structure. In one aspect, during rolling and sliding of the flexible support plate, the flexible support plate rolls and slides using the connection plate 16 and the wholly-plate-shaped structure 13 as supports; and in another aspect, the plurality of support bars 103 in the roll-slide region 12 are connected between the first side edge 15 of the wholly-plate-shaped structure 13 and the second side edge 17 of the connection plate 16, and the first side edge 15 is opposite to the second side edge 17 to support the plurality of support bars 103, such that the supporting performance of the support bar 103 is improved.

In the embodiments of the present disclosure, the roll-slide screen is further provided with a support region 3, which is opposite to the second flat region 18. The support region 3 is configured to support another side of the roll-slide display region 2 during rolling and sliding, and slide along with the another side of the roll-slide display region 2.

In some embodiments, the support region 3 is disposed on the backside of the flat display region 1 and does not display pictures.

For clearer display of the structure of the first support plate 10, in FIG. 8, the second flat region 18 is disposed in a same plane with the first flat region 11 and the roll-slide region 12.

Referring to FIG. 8 again, the first boundary support bar 101, the second boundary support bar 102, the first side edge 15, and the second side edge 17 form 4 boundaries of the roll-slide region 12.

In the embodiments of the present disclosure, an orthographic projection of the first flat region 11 on a first plane, an orthographic projection of the roll-slide region 12 on the first plane, and an orthographic projection of the second flat region 18 on the first plane are rectangular. The first plane is parallel to a surface of the wholly-plate-shaped structure 13. That is, boundaries of the first flat region 11, the roll-slide region 12, and the second flat region 18 are straight lines.

In some embodiments, the boundaries of the first flat region 11, the roll-slide region 12, and the second flat region 18 are also curves. In this case, a length of the support bar 10 in the roll-slide region 12 is modified adaptively, and a structure of the support bar 103 is not changed.

Referring to FIG. 7 again, the wholly-plate-shaped structure 13 is further provided with a third side edge 19, a fourth side edge 110, and a fifth side edge 111. The third side edge 19 is opposite to the first side edge 15, one end of the third side edge 19 is connected to one end of the first side edge 15 by the fourth side edge 110, and the other end of the third side edge 19 is connected to the other end of the first side edge 15 by the fifth side edge 111. The fourth side edge 110 is collinear with the first boundary support bar 101, and the fifth side edge 111 is collinear with the second boundary support bar 102. The first side edge 15 is a boundary between the first flat region 11 and the roll-slide region 12.

Referring to FIG. 8 again, the connection plate 16 is further provided with a sixth side edge 112, a seventh side edge 113, and an eighth side edge 114. The sixth side edge 112 is opposite to the second side edge 17, one end of the sixth side edge 112 is connected to one end of the second side edge 17 by the seventh side edge 113, and the other end of the sixth side edge 112 is connected to the other end of the second side edge 17 by the eighth side edge 114. The seventh side edge 113 is collinear with the first boundary support bar 101, and the eighth side edge 114 is collinear with the second boundary support bar 102. The second side edge 17 is a boundary between the second flat region 18 and the roll-slide region 12.

Referring to FIG. 8 again, the plurality of support bars 103 includes a plurality of first support bars 131 and a plurality of second support bars 131. The plurality of support bars are parallel to each other, and two ends of each of the first support bars 131 are respectively connected to the first boundary support bar 101 and the second boundary support bar 102.

Distances between two adjacent first support bars 131 monotonically decrease along the first direction a, and decreasing percentages of the distances between two adjacent first support bars 131 are equal. In FIG. 8, along the first direction a, a distance between a $N^{th}$ first support bar 131 and a $N+1^{th}$ first support bar 131 is L1, a distance between the $N+1^{th}$ first support bar 131 and a $N+2^{th}$ first support bar 131 is L2, and a distance between the $N+2^{th}$ first support bar 131 and a $N+3^{th}$ first support bar 131 is L3, wherein N is an integer. Then:

$$\frac{L1 - L2}{L1} = \frac{L2 - L3}{L2} \qquad (1)$$

The rest is deduced by analogy according to formula (1).

According to formula (1), differences between the distances between two adjacent first support bars 131 progressively decrease along the first direction a. In some other embodiments, the differences between the distances between two adjacent first support bars 131 are arranged to be equal, that is, the distances between two adjacent first support bars 131 progressively decrease in an equal difference.

A portion of the plurality of second support bars 132 are connected between any two adjacent first support bars 131 to define the plurality of hollowed-out regions 14. Exemplarily, the plurality of second support bars 132 are cross-connected between two adjacent first support bars 131 to form a network structure.

In the embodiments of the present disclosure, by limiting the hollowed-out regions 14 by the plurality of first support bars 131 and the plurality of second support bars 132, in one aspect, the roll-slide region 12 of the first support plate 10 is provided with the plurality of hollowed-out regions 14, and thus the capability of the first support plate 10 to absorb the stress and strain in the roll-slide region 12 is improved; and in another aspect, the first support plate 10 has a supporting force in the roll-slide region 12. Because the distances between two adjacent first support bars 131 monotonically decrease, the proportions of the total areas of the hollowed-out regions 14 in the unit areas monotonically decrease along the first direction. Therefore, the capabilities of the flexible support plate to absorb the stress and strain progressively decrease along the first direction a.

Referring to FIG. 8 again, the plurality of second support bars 132 connected between any two adjacent first support bars 131 include a plurality first unit structures A arranged along the second direction b. Any of the plurality of first unit structures A includes a first section 1321, a second section 1322, a third section 1323, a fourth section 1324, and a fifth section 1325. The first section 1321 is disposed between two adjacent first support bars 131 and extends along the second direction b. One end of the first section 1321 is connected to the two adjacent first support bars 131 respectively by the second section 1322 and the third section 1323, and the other end of the first section 1321 is connected to the two adjacent first support bars 131 respectively by the fourth section 1324 and the fifth section 1325.

In the section direction b and in any two adjacent first unit structures A, the fourth section 1324 of one of the any two adjacent first unit structures A and the second section 1322 of the other of the any two adjacent first unit structures A are connected to a same point of a same first support bar 131, and the fifth section 1325 of one of the any two adjacent first unit structures A and the third section 1323 of the other of the any two adjacent first unit structures A are connected to a same point of a same first support bar 131. The second direction b is an extension direction of the roll-slide shaft when the roll-slide region 12 rolls and slides, and is perpendicular to the first direction a. Each of the first section 1321 to the fifth section 1325 is respectively one of the second support bars 132.

In the embodiments of the present disclosure, the first section 1321 between two adjacent first support bars 131 extends along the second direction b, and the one end of the first section 1321 is connected to the two adjacent first support bars 131 respectively by the second section 1322 and the third section 1323. Therefore, extension directions of the second section 1322 and the third section 1323 are both intersected with the second direction b. Similarly, extension directions of the fourth section 1324 and the fifth section 1325 are both intersected with the second direction b. Compared with directly arranging the second section 1322, the third section 1323, the fourth section 1324, and the fifth section 1325 along the second direction b, the sum of lengths of the second section 1322, the third section 1323, the fourth section 1324, and the fifth section 1325 is increased, and the areas of the hollowed-out regions 14 between the two adjacent first support bars 131 are decreased. In this way, the supporting performance of the first support plate 10 in the roll-slide region 12 is improved, and the roll-slide region is provided with the hollowed-out regions 14, such that the capability of the first support plate 10 to absorb the stress and strain is not decreased.

Referring to FIG. 8 again, in any first unit structure A, the first section 1321, the second section 1322, the fourth section 1324, and a first support bar 131 connected between the second section 1322 and the fourth section 1324 form one of the hollowed-out regions in a shape of isosceles trapezoid. In the any first unit structure A, the first section 1321, the third section 1323, the fifth section 1325, and a first support bar 131 connected between the third section 1323 and the fifth section 1325 form another of the hollowed-out regions in the shape of isosceles trapezoid. Two adjacent isosceles trapezoidal hollowed-out regions in two first unit structures adjacent in the first direction a have a common bottom edge, and the two isosceles trapezoids with the common bottom edge are symmetrically distributed with the first support bar 131 to which the bottom edge belongs as an axis.

In the embodiments of the present disclosure, along the first direction a, two isosceles trapezoidal hollowed-out regions arranged oppositely are disposed on two sides of each of the first support bars 131.

In the embodiments of the present disclosure, the first support bar is not arranged. That is, the roll-slide region 12 is only provided with the second support bar 132, and the hollowed-out regions 14 are defined by the plurality of second support bars 132.

In some embodiments of the present disclosure, an included angle between the first section 1321 and the second section 1322 ranges from 120 degrees to 175 degrees. Similarly, an included angle between the first section 1321 and the third section 1323 ranges from 120 degrees to 175 degrees, an included angle between the first section 1321 and the fourth section 1324 ranges from 120 degrees to 175 degrees, and an included angle between the first section 1321 and the fifth section 1325 ranges from 120 degrees to 175 degrees.

In the embodiments of the present disclosure, the sum of the included angle between the first section 1321 and the second section 1322, the included angle between the first section 1321 and the third section 1323, and an included angle between the second section 1322 and the third section 1323 is 360 degrees. The sum of the included angle between the first section 1321 and the fourth section 1324, the included angle between the first section 1321 and the fifth section 1325, and an included angle between the fourth section 1324 and the fifth section 1325 is also 360 degrees.

The bendability of the flexible support plate in the roll-slide region 12 is reduced in a case that a support bar perpendicular to the roll-slide shaft is present in the roll-slide region 12. That is, the support bar extending along the first direction a reduces the bendability of the flexible support plate. The first section 1321 extends along the second direction b, the direction a is perpendicular to the second direction b, and the included angle between the first section 13221 and the second section 1322 ranges from 120 degrees to 175 degrees. That is, the second section 1322 does not extend along the first direction a, and thus the bendability of the flexible support plate is not reduced by the second section 1322. However, the support bar extending along the first direction a improves the supporting performance of the flexible support plate. The second section 1322 does not extend along the second direction b, that is, the second section 1322 has a component along the first direction a, and thus the supporting performance of the flexible support plate is improved.

In the embodiments of the present disclosure, the included angles between the first sections 1321 and the second sections 1322 in the first unit structures A monotonically increase along the first direction a. The included angles between the first sections 1321 and the second sections 1322 in the first unit structures A are equal along the second direction b.

In the embodiments of the present disclosure, the first section 1321 provides support along the second direction b. The second section 1322, the third second 1323, the fourth section 1324, and the fifth section 1325 provide support along both the first direction a and the second direction b.

In the embodiments of the present disclosure, the monotonous decrease of the distance between two adjacent first support bars 131 along the first direction a is compliant with the following rule:

$$c = d \times (1-e)^n \qquad (2)$$

In formula (2), c represents a minimum design distance; d represents a maximum design distance; e represents a distance decreasing percentage; and n represents the number of first support bars 131.

During manufacturing of the first support plate 10, a size of the roll-slide region 12 is determined, the minimum design distance c and the maximum design distance d are determined by analogue simulation, the number n of the first support bars 131 is determined according to the support required for the first support plate 10, and then the distance decreasing percentage e and the number of first unit structures A along the second direction b are calculated by formula (2). Finally, the included angle between each section of the first unit structure A is determined.

For the first support plate 10 shown in FIG. 8, the distance between the $N^{th}$ first support bar 131 and the $N+1^{th}$ first support bar 131 along the first direction a is $d \times (1-e)^N$, and N is an integer and less than n. A plurality of second support 132 bars are connected between a first first support bar 131 and the first side edge 15, and the plurality of second support bars 132 from a plurality of isosceles trapezoidal hollowed-out regions. Each of the plurality of hollowed-out regions takes the first support bar 131 as a bottom edge, the first side edge 15 as a bottom edge, and two of the plurality of second support bars 132 as waists. The isosceles trapezoidal hollowed-out regions are symmetrical to the isosceles trapezoidal hollowed-out regions which are disposed between the first first support bar 131 and a second first support bar 131 and proximal to the first flat region 11. Similarly, a plurality of second support bars are connected between a $n^{th}$ first support bar 131 and the second side edge 17, and the plurality of second support bars 132 from a plurality of isosceles trapezoidal hollowed-out regions. Each of the plurality of hollowed-out regions takes the first support bar 131 as a bottom edge, the second side edge 17 as a bottom edge, and two of the plurality of second support bars 132 as waists. The isosceles trapezoidal hollowed-out regions are symmetrical to the isosceles trapezoidal hollowed-out regions which are disposed between the $n^{th}$ first support bar 131 and a $n-1^{th}$ first support bar 131 and proximal to the second flat region 18.

In the embodiments of the present disclosure, a length of the first flat region 11 along the second direction b ranges from 120 mm to 200 mm. A width of the first flat region 11 along the first direction a ranges from 50 mm to 100 mm.

In the embodiments of the present disclosure, lengths of the roll-slide region 12 and the first flat region 11 along the second direction b both range from 120 mm to 200 mm. A width of the roll-slide region 12 along the first direction a ranges from 50 mm to 100 m.

In the embodiments of the present disclosure, the maximum design distance d ranges from 200 μm to 500 μm. The minimum design distance c ranges from 50 μm to 350 μm. The distance decreasing percentage e ranges from ( ) to 5%. For example, in some embodiments of the present disclosure, the distance decreasing percentage e is 1%, and the number of first support bars 131 ranges from 120 to 1200.

In the embodiments of the present disclosure, the number of first unit structures A along the second direction b ranges from 240 to 600.

Along the second direction b, structures and sizes of the first unit structures A are consistent. Each of the first unit structures A is disposed between two adjacent first support bars 131, and is connected to both of the two adjacent first support bars 131. Therefore, widths of the first unit structures A monotonically decrease along the first direction a. The width of the first unit structure A is a distance between the two first support bars 131 connected to the first unit structure A.

Figure 9:
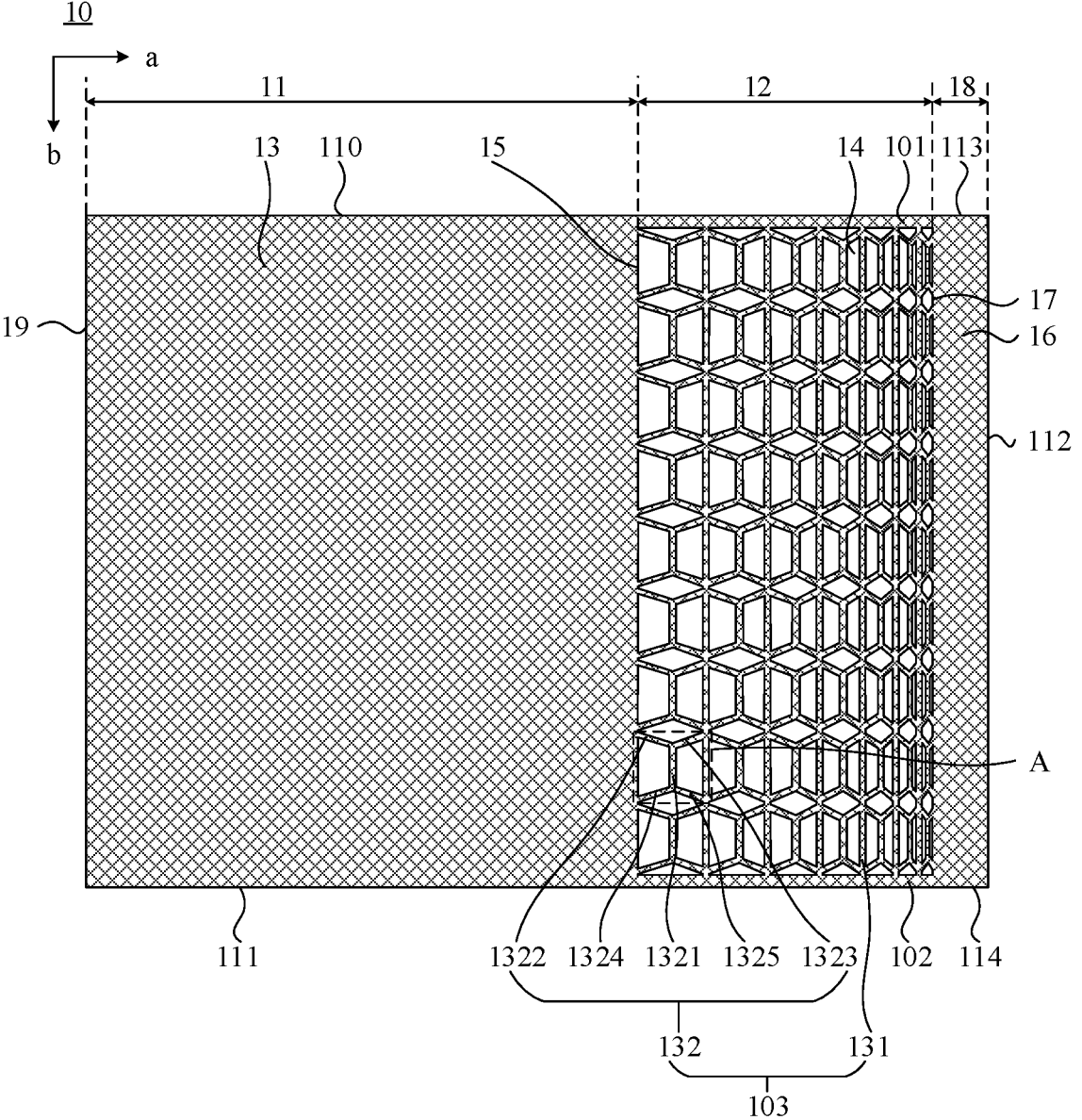
FIG. 9 is a top view of another flexible support plate according to some embodiments of the present disclosure.

FIG. 9 is a top view of another flexible support plate according to some embodiments of the present disclosure. FIG. 9 is different form FIG. 8 in that: in FIG. 8, an arrangement of the hollowed-out regions between the first side edge 15 and the first first support bar 131 is different from an arrangement of the hollowed-out regions between two adjacent first support bars 131, and isosceles trapezoidal hollowed-out regions between the first side edge 15 and the first first support bar 131 are symmetrical to isosceles trapezoidal hollowed-out regions which are disposed between the first first support bar 131 and the second first support bar 131 and proximal to the first flat region 11: whereas in FIG. 9, the arrangement of the hollowed-out regions between the first side edge 15 and the first first support bar 131 is consistent with the arrangement of the hollowed-out regions between two adjacent first support bars 131, only sizes of the hollowed-out regions between the first side edge 15 and the first first support bar 131 are greater.

For the first support plate 10 shown in FIG. 9, the distance between the $N^{th}$ first support bar 131 and the $N+1^{th}$ first support bar 131 along the first direction a is $d\times(1-e)^N$, and N is an integer and less than n. A distance between the first first support bar 131 and the first side edge 15 is d. A distance between the $n^{th}$ first support bar 131 and the second side edge 17 is $d\times(1-e)^n$.

Figure 10:
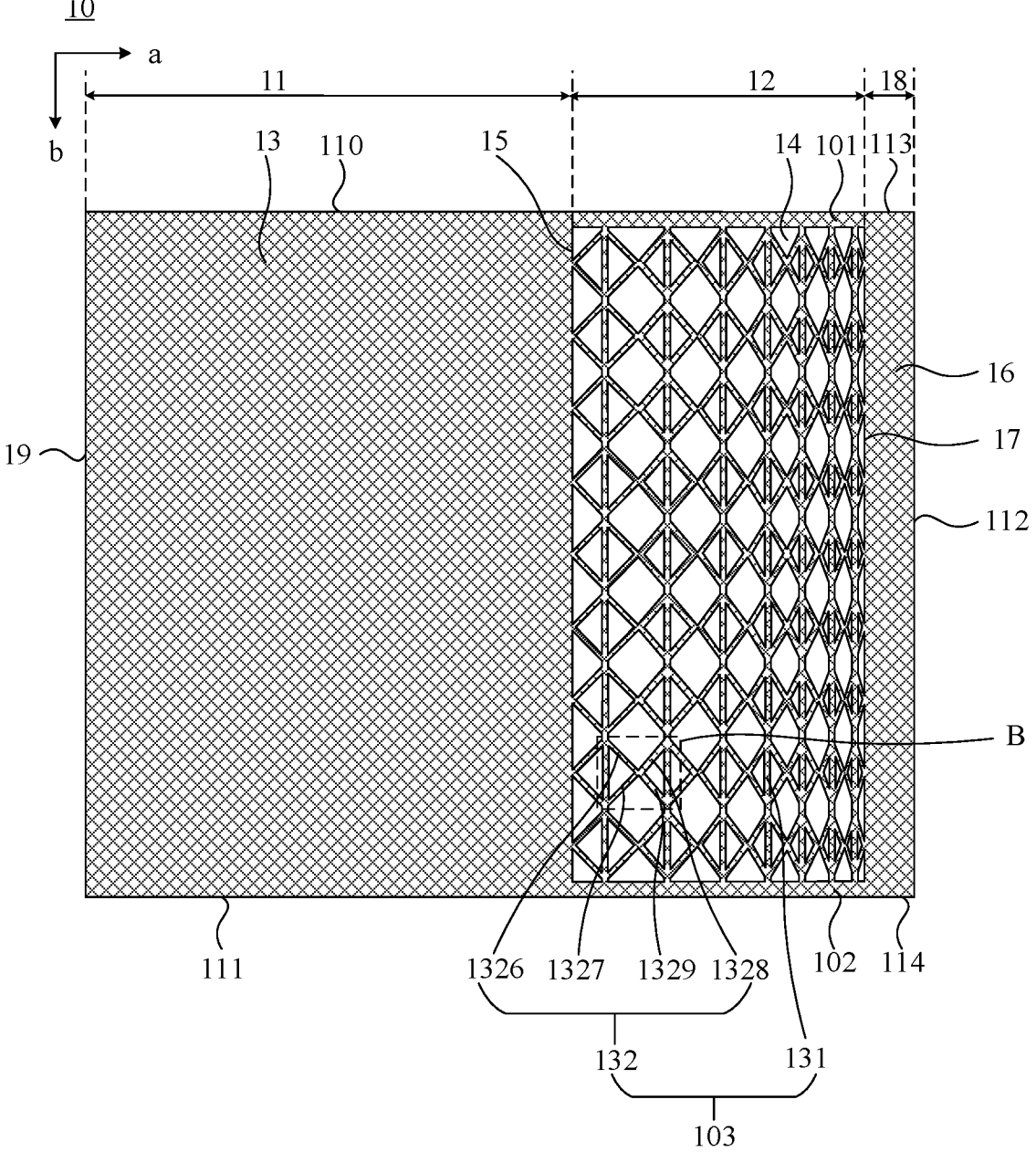
FIG. 10 is a top view of still another flexible support plate according to some embodiments of the present disclosure.

FIG. 10 is a top view of still another flexible support plate according to some embodiments of the present disclosure. The flexible support plate in FIG. 10 is different form the flexible support plate in FIG. 9 in that: a plurality of second unit structures B, formed by the plurality of second support bars 132 connected between two adjacent first support bars 131, are different; and other structures of the flexible support plates are consistent.

Referring to FIG. 10, the plurality of second support bars 132 connected between any two adjacent first support bars 131 include the plurality second unit structures B arranged along the second direction b. Any of the plurality of second unit structures B includes a sixth section 1326, a seventh section 1327, an eighth section 1328, and a ninth section 1329. One end of the sixth section 1326, one end of the seventh section 1327, one end of the eighth section 1328, and one end of the ninth section 1329 are connected to a same point. The other end of the sixth section 1326 and the other end of the seventh section 1327 are connected to one of two adjacent first support bars 131, and the other end of the eighth section 1328 and the other end of the ninth section 1329 are connected to the other of the two adjacent first support bars 131.

In the second direction b and in two adjacent second unit structures B, the other end of the seventh section 1327 of one of the two adjacent second unit structures B and the other end of the sixth section 1326 of the other of the two adjacent second unit structures B are connected to a same point of a same first support trip 131, and the other end of the ninth section 1329 of one of the two adjacent second unit structures B and the other end of the eighth section 1328 of the other of the two adjacent second unit structures B are connected to a same point of a same first support trip 131. The second direction b is an extension direction of the roll-slide shaft when the roll-slide region 12 rolls and slides, and is perpendicular to the first direction a. Each of the sixth section 1326 to the ninth section 1329 is respectively one of the second support bars 132.

Along the second direction b, structures and sizes of the second unit structures B are consistent. Extension directions of the sixth section 1326, the seventh section 1327, the eighth section 1328, and the ninth section 1329 are intersected with the second direction b. Therefore, the sum of lengths of the sixth section 1326, the seventh section 1327, the eighth section 1328, and the ninth section 1329 is increased, and the areas of the hollowed-out regions 14 are decreased. In this way, the supporting performance of the first support plate 10 in the roll-slide region 12 is improved, and the roll-slide region is provided with the hollowed-out regions 14, such that the capability of the first support plate 10 to absorb the stress and strain is not decreased.

Referring to FIG. 10 again, in any second unit structure B, the sixth section 1326, the seventh section 1327, and a first support bar 131 connected between the sixth section 1326 and the seventh section 1327 form one of the hollowed-out regions in a shape of isosceles triangle, and the eighth section 1328, the ninth section 1329, and a first support bar 131 connected between the eighth section 1328 and the ninth section 1329 form another of the hollowed-out regions in the shape of isosceles triangle. Two adjacent isosceles triangular hollowed-out regions in two first unit structures adjacent in the second direction b have a common bottom edge, and the two isosceles triangles with the common bottom edge are symmetrically distributed with the first support bar 131 to which the bottom edge belongs as an axis.

In the embodiments of the present disclosure, along the first direction a, two isosceles triangular hollowed-out regions arranged oppositely are disposed on the two sides of each of the first support bars 131.

In some embodiments of the present disclosure, an included angle between the sixth section 1326 and the seventh section 1327 ranges from 10 degrees to 170 degrees.

Similarly, an included angle between the seventh section 1327 and the eighth section 1328 ranges from 10 degrees to 170 degrees, an included angle between the eighth section 1328 and the ninth section 1329 ranges from 10 degrees to 170 degrees, and an included angle between the ninth section 1329 and the sixth section 1326 ranges from 10 degrees to 170 degrees.

In the embodiments of the present disclosure, the sum of the included angle between the sixth section 1326 and the seventh section 1327, the included angle between the seventh section 1327 and the eighth section 1328, the included angle between the eighth section 1328 and the ninth section 1329, and the included angle between the ninth section 1329 and the sixth section 1326 is 360 degrees.

The sixth section 1326, the seventh section 1327, and the first support bar 131 connected between the sixth section 1326 and the seventh section 1327 form the isosceles triangular hollowed-out region, that is, the sixth section 1326 and the seventh section 1327 do not extend along the first direction a. Therefore, the bendability of the flexible support plate is not reduced by the sixth section 1326 and the seventh section 1327. Meanwhile, the sixth section 1326 and the seventh section 1327 do not extend along the second direction b, that is, the sixth section 1326 and the seventh section 1327 have a component along the first direction a such that the supporting performance of the flexible support plate is improved.

In the embodiments of the present disclosure, the included angles between the sixth sections 1326 and the seventh sections 1327 in the second unit structures B monotonically increase along the first direction a. The included angles between the sixth sections 1326 and the seventh sections 1327 in the second unit structures B are equal along the second direction b.

In the embodiments of the present disclosure, the number of second unit structures B along the second direction b ranges from 240 to 1000.

Figure 11:
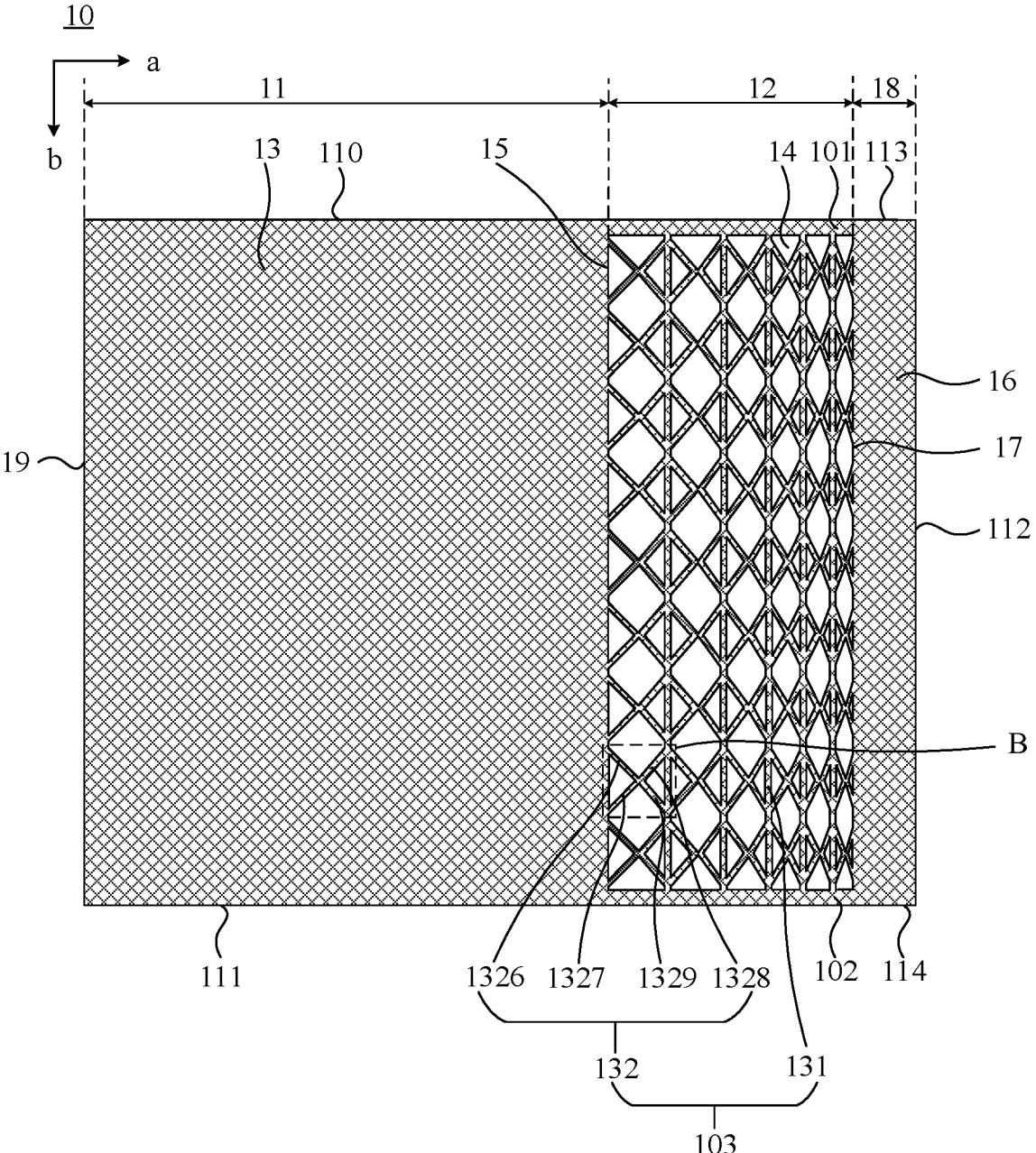
FIG. 11 is a top view of still another flexible support plate according to some embodiments of the present disclosure.

FIG. 11 is a top view of still another flexible support plate according to some embodiments of the present disclosure. FIG. 11 is different from FIG. 10 in that: in FIG. 10, an arrangement of the hollowed-out regions between the first side edge 15 and the first first support bar 131 is different from an arrangement of the hollowed-out regions between two adjacent first support bars 131, and isosceles triangular hollowed-out regions between the first side edge 15 and the first first support bar 131 are symmetrical to isosceles triangular hollowed-out regions disposed between the first first support bar 131 and the second first support bar 131: whereas in FIG. 9, the arrangement of the hollowed-out regions between the first side edge 15 and the first first support bar 131 is consistent with the arrangement of the hollowed-out regions between two adjacent first support bars 131, only the sizes of the hollowed-out regions between the first side edge 15 and the first first support bar 131 are greater.

Figures 12, 13:
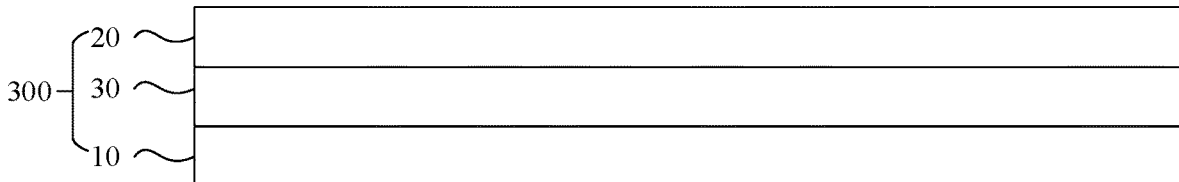
FIG. 12 is a top view of still another flexible support plate according to some embodiments of the present disclosure.
FIG. 13 is a cross-sectional schematic diagram of a flexible support plate according to some embodiments of the present disclosure.

FIG. 12 is a top view of still another flexible support plate according to some embodiments of the present disclosure. Referring to FIG. 12, the plurality of support bars 103 are parallel to each other. Two ends of one of the support bars 103 are respectively connected to the first boundary support bar 101 and the second boundary support bar 102, and distances between two adjacent support bars 101 monotonically decrease along the first direction a. A region between two adjacent support bars 103 is one of the hollowed-out regions 14.

Exemplarily, in the embodiments shown in FIG. 12, one of the hollowed-out regions 14 is defined between the first side edge 15 and a first support bar 103 in the first direction a, and one of the hollowed-out regions 14 is defined between the second side edge 17 and a last support bar 103 in the first direction a.

FIG. 12 is different from FIG. 8 and FIG. 10 in that: two adjacent support bars 103 in FIG. 12 are not arranged with other structures. That is, in FIG. 12, only the above first support bar 131 is provided and the second support bar is not.

Compared with structures in FIG. 8 and FIG. 10, the first support plate in FIG. 12 is more likely to manufacture, and has the good bendability. Whereas compared with a structure in FIG. 12, the supporting performance of the first support plates in FIG. 8 and FIG. 10 are enhanced. Specifically, in FIG. 8, the number of second support bars 132 is more, and the areas of the hollowed-out regions 14 in the roll-slide region 12 are less, and thus the supporting performance of the first support plate in FIG. 8 is better than the supporting performance of the first support plate in FIG. 10.

In FIG. 12, a ratio of a maximum width of the hollowed-out regions 14 to a width of the support bar 103 ranges from 0.5:1 to 3:1. In this way, the areas of the hollowed-out regions in the roll-slide region 12 are enough great, such that the roll-slide region 12 is bendable; and the number of support bars 103 in the roll-slide region 12 is enough more, such that the roll-slide region 12 is supportive. In practice, the ratio of the width of the hollowed-out region 14 to the width of the support bar 103 is adjusted according to actual needs to ensure that film layers in the roll-slide screen do not collapse in the roll-slide region 12.

In some embodiments of the present disclosure, the width of the support bar 103 ranges from 50 μm to 350 μm.

Exemplarily, in FIG. 8 to FIG. 11, the width of the support bar 103 is 200 μm. In FIG. 12, the width of the support bar 103 is 300 μm. The width of the support bar 103 in FIG. 12 is increased to ensure that the roll-slide region 12 is supportive.

In the embodiments of the present disclosure, the first support plate 10 not only needs to be bendable, but also needs to be supportive. The supporting performance of the first support plate 10 in the roll-slide region 12 is provided by the support bar 103, and is controlled by controlling the width of the support bar 103. By limiting the width of the support bar 103 between 50 μm to 350 μm, the supporting performance of the first support plate 10 is ensured, and the width of the support bar 103 is not such great that the bendability of the first support plate 10 in the roll-slide region 12 is not affected.

In the embodiments of the present disclosure, in a case that area of the roll-slide region 12 is constant, the total areas of the hollowed-out regions 14 are adjusted by adjusting the width of the support bar 103. The greater the width of the support bar 103 is, the less the total areas of the hollowed-out regions are; and the less the width of the support bar 103 is, and the greater the total areas of the hollowed-out regions are. That is, the total areas of the hollowed-out regions are negatively correlated with the width of the support bar 103.

In the embodiments of the present disclosure, widths of the first boundary support bar 101 and the second boundary support bar 102 range from 200 μm to 1000 μm.

The first boundary support bar 101 and the second boundary support bar 102 are disposed on two sides of the roll-slide region 12 to support the support bar 103. The widths of the first boundary support bar 101 and the second boundary support bar 102 are increased to ensure the supporting performance of the first boundary support bar 101 and the second boundary support bar 102.

In some embodiments of the present disclosure, the first support plate 10 is a titanium plate or an alloy plate.

The titanium plate and the alloy plate have the sufficient intensity to ensure the supporting performance of the first support plate 10. Meanwhile, the titanium plate and the alloy plate have the sufficient bendability to ensure the bendability of the first support plate 10. Exemplarily, the alloy plate is a stainless steel plate.

In some embodiments of the present disclosure, a thickness of the first support plate 10 ranges from 100 μm to 500 μm.

In the embodiments of the present disclosure, because the first support plate 10 is provided with the hollowed-out regions 14 in the roll-slide region 12, the intensity and supporting performance of the first support plate 10 in the roll-slide region 12 are weak. By limiting the width of the first support plate 10 between 100 μm to 500 μm, the first support plate 10 is not such thin that the intensity and supporting performance of the first support plate 10 in the roll-slide region 12 are not weakened, and thus the first support plate is prevented from being damaged.

FIG. 13 is a cross-sectional schematic diagram of a flexible support plate according to some embodiments of the present disclosure. Referring to FIG. 13, the flexible support plate 300 further includes: a second support plate 20 and an adhesive layer 30. The second support plate 20 is coincident with the first support plate 10, and the second support plate 20 is of the wholly-plate-shaped structure. The adhesive layer 30 is adhered between the first support plate 10 and the second support plate 20.

In the embodiments of the present disclosure, the flexible support plate is configured to be a supporting part of a flexible display apparatus. The first support plate 10 is provided with the hollowed-out regions 14 in the roll-slide region 12, and therefore, when other film layers of a display module of the flexible display apparatus are overlaid on the first support plate 10, the film layers of the display module are thin, and shapes of the hollowed-out regions 14 appear in the film layers of the display module and form prints, which affect a display effect. By arranging the second support plate 20 without hollowed-out regions between the first support plate 10 and the display module, the hollowed-out regions 14 in the first support plate 10 are shielded by the second support plate 20. After overlaying the display module, the prints formed by the hollowed-out regions 14 are eliminated. Meanwhile, the adhesive layer 30 is arranged to adhere the first support plate 10 to the second support plate 20, which ensures that the first support plate 10 is firmly connected to the second support plate 20.

The intensity of the flexible support plate is enhanced by arranging the first support plate 10 and the second support plate 20 in the flexible support plate, compared with arranging only one support plate. In this way, the anti-falling capability of the flexible support plate is improved, and the flexible support plate is not damaged easily even though falling accidentally.

In some embodiments of the present disclosure, the second support plate 20 is a titanium plate or an alloy plate (e.g., a stainless steel plate), which ensures that the supporting performance and bendability of the second support plate 20.

In some embodiments of the present disclosure, the second support plate 20 is also provided with a flat region corresponding to the first flat region 11 of the first support plate 10 and a roll-slide region corresponding to the roll-slide region 12 of the first support plate 10. The flat region and the roll-slide region of the second support plate 20 are both of the wholly-plate-shaped structures without hollowout parts. During rolling and sliding of the flexible support plate, the roll-slide region of the second support plate also needs to be bendable.

In some embodiments of the present disclosure, a thickness of the second support plate 20 ranges from 20 μm to 100 μm.

In the embodiments of the present disclosure, the thickness of the second support plate 20) is smaller than the thickness of the first support plate 10. The hollowed-out regions are not required to be configured in the second support plate 20, and thus the intensity of the second support plate 20 is greater than the intensity of the first support plate 10 under the same thickness. Therefore, in a case that the thickness of the second support plate 20 is less than the thickness of the first support plate 10, the second support plate 20 is not affected, and a thickness of the whole flexible support plate is reduced.

Because the bendability of the second support plate 20 is negatively correlated with the thickness of the second support plate 20, the bendability of the second support plate 20 is ensured by reducing the thickness of the second support plate 20.

In some embodiments of the present disclosure, the adhesive layer 30 is an optically clear adhesive (OCA) layer. The adhesion of the optically clear adhesive is enhanced, which ensures that the first support plate 10 is firmly connected to the second support plate 20.

Alternatively, in some other embodiments, the adhesive layer is a pressure sensitive adhesive (PSA) layer.

In the embodiments of the present disclosure, a material of the adhesive later 30 disposed in the first flat region 11 of the first support plate 10 and a material of the adhesive layer 30 disposed in the roll-slide region 12 of the first support plate 10 are consistent or different, which is not limited herein.

In some embodiments of the present disclosure, a thickness of the adhesive layer 30 ranges from 10 μm to 300 μm.

In the embodiments of the present disclosure, the greater the thickness of the adhesive layer 30 is, the more firmly the first support plate 10 is connected to the second support plate 20, and the greater the thickness of the flexible support plate is. In a case that the thickness of the flexible support plate is increased, the bendability of the flexible support plate is reduced. By limiting the thickness of the adhesive layer 30 from 10 μm to 300 μm, the first support plate 10 is firmly connected to the second support plate 20, and the bendability of the flexible support plate is prevented from being affected by a large thickness of the adhesive layer 30.

The first support plate 10 includes the hollowed-out regions, and the adhesive is fluent. Therefore, during manufacturing of the flexible support plate, the liquid adhesive enters the hollowed-out regions 14, and a portion of the solidified adhesive is disposed in the hollowed-out regions 14 upon solidification of the adhesive. That is, the hollowed-out regions 14 include the adhesive layer 30. However, only a portion of the hollowed-out regions 14 instead of the entire holloed-out parts 14 are filled with the adhesive. In this way, in the embodiments of the present disclosure, a portion of the adhesive layer 30 is disposed in the hollowed-out regions 14, and a ratio of a volume of the adhesive layer 30 in any of the hollowed-out regions 14 to a total volume of the hollowed-out region 14 where the adhesive layer 30 is disposed ranges from 10% to 20%.

Some embodiments of the present disclosure provide a method for manufacturing a flexible support plate. FIG. 14 is a flowchart of a method for manufacturing a flexible support plate according to some embodiments of the present disclosure. Referring to FIG. 14, the method includes the following steps.

In step S1, a first support plate is provided, wherein the support plate is provided with a first flat region and a roll-slide region that are connected to each other.

In the embodiments of the present disclosure, the first support plate is a titanium plate or an alloy plate. The titanium plate and the alloy plate have sufficient intensity to ensure the supporting performance of the first support plate. Meanwhile, the titanium plate and the alloy plate have sufficient bendability to ensure the bendability of the first support plate.

In step S2, a plurality of hollowed-out regions arranged at intervals are defined in the roll-slide region of the first support plate, such that the first support plate includes a wholly-plate-shaped structure disposed in the first flat region and a plate-shaped structure disposed in the roll-slide region and provided with the plurality of hollowed-out regions. In the roll-slide region, proportions of total areas of the hollowed-out regions in unit areas monotonically decrease along a first direction, such that capabilities of the flexible support plate to absorb stress and strain in the roll-slide region monotonically decrease along the first direction. The first direction is a direction from the first flat region to the roll-slide region.

In the embodiments of the present disclosure, the roll-slide region of the first support plate is provided with the plurality of hollowed-out regions by performing a patterning process such as glue, mask, exposure, develop, and etch, on the roll-slide region of the first support plate by a mask plate.

Referring to FIG. 14 again, the method further includes the following steps.

In step S3, an adhesive layer is coated in a second support plate.

In the embodiments of the present disclosure, a liquid adhesive is coated on the second support plate.

In the embodiments of the present disclosure, the second support is a titanium plate or an alloy plate. The adhesive layer is an optically clear adhesive layer or a pressure sensitive adhesive layer.

In step S4, the second support plate is adhered to the first support plate by the adhesive layer.

In the embodiments of the present disclosure, the manufactured first support plate is attached to the liquid adhesive. The second support plate is adhered to the first support plate by the adhesive layer formed after the liquid adhesive is solidified.

Some embodiments of the present disclosure provide a display apparatus. The display apparatus includes the flexible support plate as described in any one of FIG. 8 to FIG. 13 and a display module disposed on a support plate.

FIG. 15 is a cross-sectional schematic diagram of a display apparatus according to some embodiments of the present disclosure. Referring to FIG. 15, the display apparatus includes the display module 400 and a cover plate 500 that are successively stacked on the flexible support plate 200. The display module 400 includes a functional layer 4001 and a key layer 4002.

The functional layer 4001 includes structures with optical and touch functions, such as a polarizer and a touch unit. The key layer 402 includes an emitting layer and a circuit layer, which are configured for an emitting display of the display apparatus. The cover plate 500 protects the display module 400.

Exemplarily, the cover plate 500 is a flexible cover plate, which ensures the bendability of the display apparatus.

The display apparatus according to the embodiments of the present disclosure is a liquid crystal display (LCD) apparatus or an organic light-emitting diode (OLED) display apparatus. In practice, the display apparatus according to the embodiments of the present disclosure is a smart phone, a table computer, a television, a display, a notebook computer, a digital photo frame, a navigator, or any product with display and roll-slide functions.

Described above are merely optional embodiments of the present disclosure, and are not intended to limit the present disclosure. Any modifications, equivalent substitutions, improvements, and the like may be made within the protection scope of the present disclosure, without departing from the spirit and principles of the present disclosure.

What is claimed is:

1. A flexible support plate, comprising: a first support plate; wherein the first support plate is provided with a first flat region and a roll-slide region that are connected to each other; and the first support plate comprises a wholly-plate-shaped structure disposed in the first flat region and a plate-shaped structure disposed in the roll-slide region and provided with a plurality of hollowed-out regions;

wherein in the roll-slide region, proportions of total areas of the hollowed-out regions in unit areas monotonically decrease along a first direction, such that capabilities of the flexible support plate to absorb stress and strain, in the roll-slide region, monotonically decrease along the first direction, the first direction being a direction from the first flat region to the roll-slide region, wherein the first support plate further comprises: a first boundary support bar, a second boundary support bar, and a plurality of support bars that are disposed in the roll-slide region;

wherein one end of the first boundary support bar and one end of the second boundary support bar are connected to a first side edge of the wholly-plate-shaped structure, the first boundary support bar and the second boundary support bar both extend along the first direction, the other end of the first boundary support bar is connected to the other end of the second boundary support bar by a second side edge of a connection plate, and the plurality of support bars are connected between the first boundary support bar and the second boundary support bar to define the plurality of hollowed-out regions, wherein the plurality of support bars comprises a plurality of first support bars and a plurality of second support bars;

wherein the plurality of first support bars are parallel to each other, two ends of each of the first support bars are respectively connected to the first boundary support bar and the second boundary support bar, and distances between two adjacent first support bars monotonically decrease along the first direction;

wherein a portion of the plurality of second support bars is connected between any two adjacent first support bars to define the plurality of hollowed-out regions, wherein the portion of the plurality of second support bars connected between any two adjacent first support bars comprises a plurality of first unit structures arranged along a second direction, any of the plurality of first unit structures comprising a first section, a second section, a third section, a fourth section, and a fifth section, wherein the first section is disposed between two adjacent first support bars and extends along the second direction, one end of the first section is connected to the two adjacent first support bars respectively by the second section and the third section, and the other end of the first section is connected to the two adjacent first support bars respectively by the fourth section and the fifth section; and in the second direction and in any two adjacent first unit structures, the fourth section of one of the any two adjacent first unit structures and the second section of the other of the any two adjacent first unit structures are connected to the same point of the same first support bar, and the fifth section of one of the any two adjacent first unit structures and the third section of the other of the any two adjacent first unit structures are connected to the same point of the same first support bar;

wherein the second direction is an extension direction of a roll-slide shaft when the roll-slide region rolls and slides and is perpendicular to the first direction, and each of the first section to the fifth section is respectively one of the plurality of second support bars.

2. The flexible support plate according to claim 1, wherein in any of the plurality of first unit structures, the first section, the second section, the fourth section, and a first support bar connected between the third section and the fourth section form one of the hollowed-out regions in a shape of isosceles trapezoid; and in the any of the plurality of first unit structures, the first section, the third section, the fifth section, and a first support bar connected between the third section and the fifth section form another of the hollowed-out regions in the shape of isosceles trapezoid;

wherein two adjacent isosceles trapezoidal hollowed-out regions of two first unit structures adjacent in the second direction have a common bottom edge, the two isosceles trapezoids with the common bottom edge being symmetrically distributed with the first support bar to which the bottom edge belongs as an axis.

3. The flexible support plate according to claim 1, wherein an included angle between the first section and the second section ranges from 120 degrees to 175 degrees.

4. The flexible support plate according to claim 1, wherein the portion of the plurality of second support bars connected between any two adjacent first support bars comprise a plurality of second unit structures arranged along a second direction, any of the plurality of second unit structures comprising a sixth section, a seventh section, an eighth section, and a ninth section, wherein one end of the sixth section, one end of the seventh section, one end of the eighth section, and one end of the ninth section are connected at a same point, the other end of the sixth section and the other end of the seventh section are connected to one of two adjacent first support bars, and the other end of the eighth section and the other end of the ninth section are connected to the other of the two adjacent first support bars; and in the second direction and in any two adjacent second unit structures, the other end of the seventh section of one of the any two adjacent second unit structures and the other end of the sixth section of the other of the any two adjacent second unit structures are connected to a same point of a same first support bar, and the other end of the ninth section of one of the any two adjacent second unit structures and the other end of the eighth section of the other of the any two adjacent second unit structures are connected to a same point of a same first support bar;

wherein the second direction is an extension direction of a roll-slide shaft when the roll-slide region rolls and slides and is perpendicular to the first direction, and each of the sixth section to the ninth section is respectively one of the plurality of second support bars.

5. The flexible support plate according to claim 4, wherein in any of the plurality of second structures, the sixth section, the seventh section, and a first support bar connected between the sixth section and the seventh section form one of the hollowed-out regions in a shape of isosceles triangle; and in the any of the plurality of first unit structures, the eighth section, the ninth section, and a first support bar connected between the eighth section and the ninth section form another of the hollowed-out regions in the shape of isosceles triangle;

wherein two adjacent isosceles triangular hollowed-out regions of two second unit structures adjacent in the second direction have a common bottom edge, the two isosceles triangles with the common bottom edge being symmetrically distributed with the first support bar to which the bottom edge belongs as an axis.

6. The flexible support plate according to claim 4, wherein an included angle between the sixth section and the seventh section ranges from 10 degrees to 170 degrees.

7. The flexible support plate according to claim 1, wherein the plurality of support bars are parallel to each other, two ends of each of the support bars are respectively connected to the first boundary support bar and the second boundary support bar, and distances between two adjacent support bars monotonically decrease along the first direction;

wherein a region between two adjacent support bars is one of the hollowed-out regions.

8. The flexible support plate according to claim 1, wherein a width of each of the plurality of support bars ranges from 50 μm to 350 μm.

9. The flexible support plate according to claim 1, wherein the proportions of the total areas of the hollowed-out regions in the unit areas are equal along the second direction, wherein the second direction is the extension direction of a roll-slide shaft when the roll-slide region rolls and slides and is perpendicular to the first direction.

10. The flexible support plate according to claim 1, wherein the first support plate is a titanium plate or an alloy plate.

11. The flexible support plate according to claim 10, wherein a thickness of the first support plate ranges from 100 μm to 500 μm.

12. The flexible support plate according to claim 1, further comprising:

a second support plate, wherein the second support plate is of a wholly-plate-shaped structure; and an adhesive layer, adhered between the first support plate and the second support plate.

13. The flexible support plate according to claim 12, wherein a thickness of the second support plate ranges from 20 μm to 100 μm; and a thickness of the adhesive layer ranges from 10 μm to 300 μm.

14. The flexible support plate according to claim 12, wherein a portion of the adhesive layer is disposed in the hollowed-out regions, and a ratio of a volume of the adhesive layer in any of the hollowed-out regions to a total volume of the hollowed-out region where the adhesive layer is disposed ranges from 10% to 20%.

15. A display apparatus, comprising: a flexible support plate and a display module disposed on the flexible support plate;

wherein the flexible support plate comprises a first support plate; wherein the first support plate is provided with a first flat region and a roll-slide region that are connected to each other; and the first support plate comprises a wholly-plate-shaped structure disposed in the first flat region and a plate-shaped structure disposed in the roll-slide region and provided with a plurality of hollowed-out regions;

wherein in the roll-slide region, proportions of total areas of the hollowed-out regions in unit areas monotonically decrease along a first direction, such that capabilities of the flexible support plate to absorb stress and strain, in the roll-slide region, monotonically decrease along the first direction, the first direction being a direction from the first flat region to the roll-slide region, wherein the first support plate further comprises: a first boundary support bar, a second boundary support bar, and a plurality of support bars that are disposed in the roll-slide region;

wherein one end of the first boundary support bar and one end of the second boundary support bar are connected to a first side edge of the wholly-plate-shaped structure, the first boundary support bar and the second boundary support bar both extend along the first direction, the other end of the first boundary support bar is connected to the other end of the second boundary support bar by a second side edge of a connection plate, and the plurality of support bars are connected between the first boundary support bar and the second boundary support bar to define the plurality of hollowed-out regions, wherein the plurality of support bars comprises a plurality of first support bars and a plurality of second support bars;

wherein the plurality of first support bars are parallel to each other, two ends of each of the first support bars are respectively connected to the first boundary support bar and the second boundary support bar, and distances between two adjacent first support bars monotonically decrease along the first direction;

wherein a portion of the plurality of second support bars is connected between any two adjacent first support bars to define the plurality of hollowed-out regions, wherein the portion of the plurality of second support bars connected between any two adjacent first support bars comprises a plurality of first unit structures arranged along a second direction, any of the plurality of first unit structures comprising a first section, a second section, a third section, a fourth section, and a fifth section, wherein the first section is disposed between two adjacent first support bars and extends along the second direction, one end of the first section is connected to the two adjacent first support bars respectively by the second section and the third section, and the other end of the first section is connected to the two adjacent first support bars respectively by the fourth section and the fifth section; and in the second direction and in any two adjacent first unit structures, the fourth section of one of the any two adjacent first unit structures and the second section of the other of the any two adjacent first unit structures are connected to the same point of the same support bar, and the fifth section of one of the any two adjacent first unit structures and the third section of the other of the any two adjacent first unit structures are connected to the same point of the same first support bar;

wherein the second direction is an extension direction of a roll-slide shaft when the roll-slide region rolls and slides and is perpendicular to the first direction, and each of the first section to the fifth section is respectively one of the plurality of second support bars.

16. The display apparatus according to claim 15, wherein the first support plate further comprises: a first boundary support bar, a second boundary support bar, and a plurality of support bars that are disposed in the roll-slide region;

wherein one end of the first boundary support bar and one end of the second boundary support bar are connected to a first side edge of the wholly-plate-shaped structure, the first boundary support bar and the second boundary support bar both extend along the first direction, the other end of the first boundary support bar is connected to the other end of the second boundary support bar by a second side edge of a connection plate, and the plurality of support bars are connected between the first boundary support bar and the second boundary support bar to define the plurality of hollowed-out regions.

17. The display apparatus according to claim 16, wherein the plurality of support bars comprises a plurality of first support bars and a plurality of second support bars;

wherein the plurality of first support bars are parallel to each other, two ends of each of the first support bars are respectively connected to the first boundary support bar and the second boundary support bar, and distances between two adjacent first support bars monotonically decrease along the first direction;

wherein a portion of the plurality of second support bars are connected between any two adjacent first support bars to define the plurality of hollowed-out regions.

* * * * *